United States Patent
Hartke et al.

(10) Patent No.: US 6,226,557 B1
(45) Date of Patent: May 1, 2001

(54) METHOD FOR THE CLOSED-LOOP CONTROL OF A CONTROLLED SYSTEM, IN PARTICULAR OF AN INTERNAL COMBUSTION ENGINE

(75) Inventors: Andreas Hartke; Achim Przymusinski, both of Regensburg; Dirk Heinitz, Schönhofen, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/124,594

(22) Filed: Jul. 29, 1998

Related U.S. Application Data

(63) Continuation of application No. PCT/DE97/00152, filed on Jan. 28, 1997.

(30) Foreign Application Priority Data

Jan. 29, 1996 (DE) .............................. 196 03 091

(51) Int. Cl.[7] .................................................. G05B 13/02
(52) U.S. Cl. ............................................................ 700/42
(58) Field of Search ........................... 700/28, 34, 37, 700/41, 42, 43, 45, 48, 49, 54

(56) References Cited

U.S. PATENT DOCUMENTS

| | | | |
|---|---|---|---|
| 4,438,496 | * 3/1984 | Ohie | 701/104 |
| 4,882,526 | * 11/1989 | Iino et al. | 318/561 |
| 5,726,880 | * 3/1998 | Bailey et al. | 700/72 |
| 5,812,428 | * 9/1998 | Zou et al. | 700/34 |
| 5,829,335 | * 11/1998 | Ewald et al. | 91/363 A |
| 5,847,952 | * 12/1998 | Samad | 700/48 |

FOREIGN PATENT DOCUMENTS

| | | |
|---|---|---|
| 0 176 323 A2 | 4/1986 | (EP) . |
| 2 111 253 | 6/1983 | (GB) . |

OTHER PUBLICATIONS

Patent Abstracts of Japan No. 60–258607 (Kunihiko et al.), dated Dec. 20, 1985.

\* cited by examiner

*Primary Examiner*—William Grant
*Assistant Examiner*—Ronald D Hartman, Jr.
(74) *Attorney, Agent, or Firm*—Herbert L. Lerner; Laurence A. Greenberg; Werner H. Stemer

(57) ABSTRACT

A method for the closed-loop control of a nonlinear controlled system in which a state variable of the controlled system is determined and an actuating value is determined using a control method and a reference variable. In addition, by using the state variable of the controlled system, a correction value is read from a linearization characteristic curve and multiplied by the actuating value and the product is specified as new desired value for the controlled system. The linearization characteristic curve is chosen in such a way that multiplication of the linearization characteristic curve by the nonlinear control action of the controlled system yields a linear control action.

6 Claims, 1 Drawing Sheet

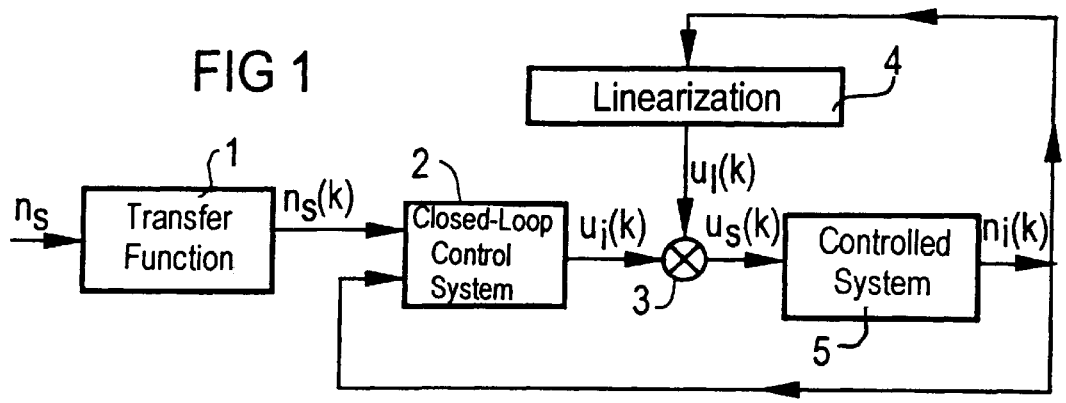
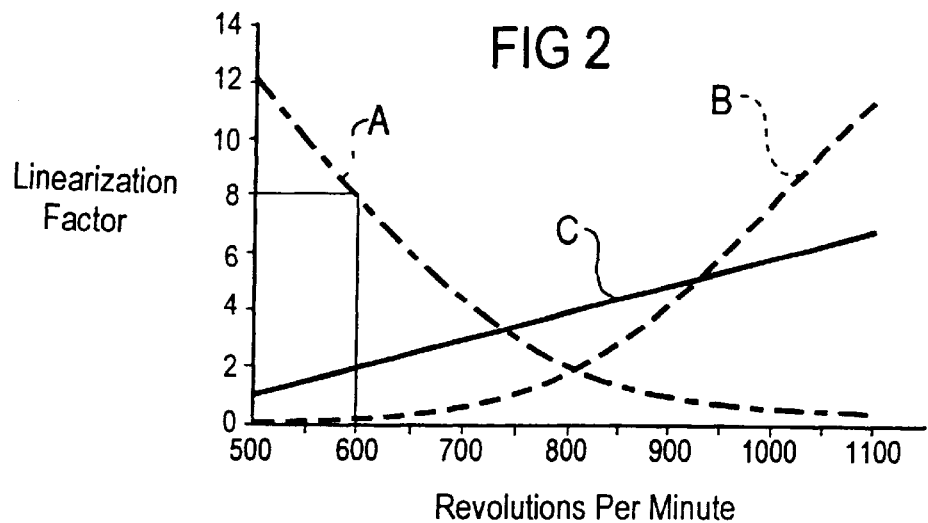
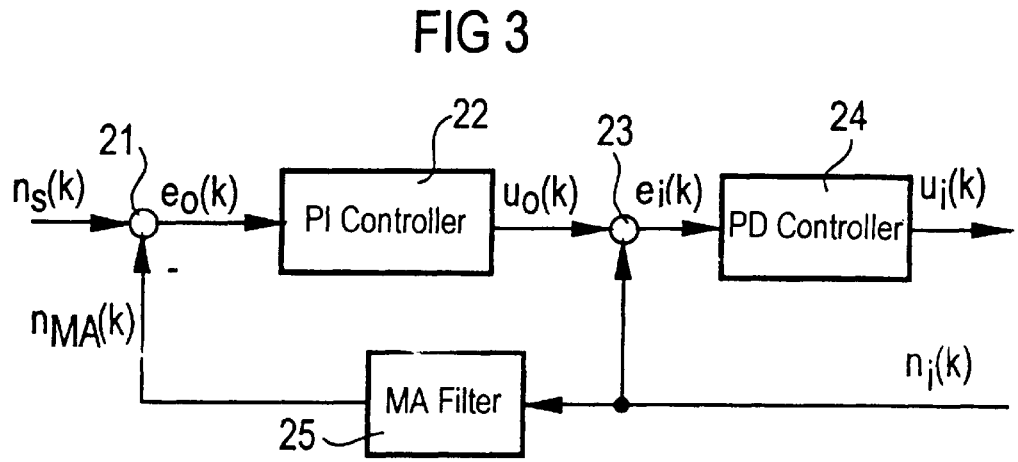

METHOD FOR THE CLOSED-LOOP CONTROL OF A CONTROLLED SYSTEM, IN PARTICULAR OF AN INTERNAL COMBUSTION ENGINE

CROSS-REFERENCE TO RELATED APPLICATION

This is a continuation of copending International Application PCT/DE97/00152, filed Jan. 28, 1997, which designated the United States.

BACKGROUND OF THE INVENTION

Field of the Invention

The invention relates to a method for the closed-loop control of a controlled system.

A PID control method, which has proportional, integral and derivative (PID) action, for the closed-loop control of diesel injection is disclosed in European Patent Application No. 0 176 323 A2. In that case, the functioning of the PID control method is coordinated with a nonlinear engine function that is to be controlled. The consequence of this is that the PID control method can be used only for the engine function for which the PID control method has been tailored for.

SUMMARY OF THE INVENTION

It is accordingly an object of the invention to provide a method for the closed-loop control of a controlled system, in particular of an internal combustion engine which overcomes the above-mentioned disadvantages of the prior art methods of this general type, in which simple adaptation to different controlled systems, in particular engine functions, is possible.

With the foregoing and other objects in view there is provided, in accordance with the invention, a method for the closed-loop control of a controlled system, which includes: determining a state variable of a controlled system; subtracting the state variable from a reference variable for deriving a first input value; subjecting the first input value to a proportional and integral control process for deriving an output value; subtracting the state variable from the output value for deriving a second input value; subjecting the second input value to a proportional and derivative control process for deriving an actuating value; weighting the actuating value with a correction value, the correction value chosen as a function of the state variable of the controlled system wherein the weighting of the actuating value with the correction value leads to a linear control action of the controlled system; and feeding the weighted actuating value to the controlled system.

An essential advantage of the invention is that the state variable of the controlled system is linearized and the linearized state variable is taken into account during the specification of a new actuating value.

In accordance with an added feature of the invention, there is the step of multiplying the actuating value by the correction value in the weighting step.

In accordance with an additional feature of the invention, there is the step of averaging the state variable over time before subtracting the state variable from the reference variable.

In accordance with another feature of the invention, there is the step of using the reference variable as a temporally delaying reference variable.

In accordance with a further added feature of the invention, there is the step of using the following function as the proportional and integral control process:

$$uo(k) = uo(k-1) + K0 * \left[eo(k) - \left(1 - \frac{Ta}{Tn}\right)eo(k-1)\right],$$

where uo(k) represents the output value, eo(k) represents the first input value, K0 represents a gain factor, Ta represents a sampling time and Tn represents an integral action time.

In accordance with a concomitant feature of the invention, there is the step of using the following function as the proportional and derivative control process:

$$ui(k) = Ki * \left[ei(k) - \frac{Tv}{Ta}(ei(k) - ei(k-1))\right],$$

where ui(k) designates the actuating value, ei(k) designates the second input value, Ki designates a second gain factor, Ta designates a sampling time and Tv designates a derivative action time.

Other features which are considered as characteristic for the invention are set forth in the appended claims.

Although the invention is illustrated and described herein as embodied in a method for the closed-loop control of a controlled system, in particular of an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a block diagram of a control process according to the invention;

FIG. 2 is a linearization graph; and

FIG. 3 is a block diagram of specific structures of a closed-loop control system.

DESCRIPTION OF THE PREFERRED EMBODIMENTS

Referring now to the figures of the drawing in detail and first, particularly, to FIG. 1 thereof, there is described below a closed-loop control of a desired speed of an internal combustion engine, but the invention can be employed for the closed-loop control of any functions of a controlled system 5, in particular of an internal combustion engine. In the text below, the values used are specified as a function of a timing pulse k with respect to which the values are sampled.

In FIG. 1, a desired speed ns, which is specified by a family of characteristics, is used for the calculation of a transfer function 1 (program point 1) in which a delayed desired speed ns(k) is calculated for the timing pulse k. The delayed desired speed ns(k) is subsequently received at the closed loop control system 2 (program point 2) for the calculation of a closed loop control method. An actuating value ui(k) is calculated from the delayed desired speed ns(k) using a cylinder-selective speed ni(k) at the program point 2. At program point 3, the actuating value ui(k) is multiplied by a linearization factor ul(k) and a manipulated variable us(k) is thus calculated which is specified the controlled system 5 (program point 5).

In the exemplary embodiment, the manipulated variable us(k) designates a mass of fuel which is injected into the internal combustion engine. In the exemplary embodiment, the speed of each cylinder of the internal combustion engine is measured and the cylinder-selective speed ni(k) is used as a state variable of the controlled system 5 at the program point 2 for the determination of the actuating value ui(k). Furthermore, the cylinder-selective speed ni(k) is used at program point (linearization) 4 for the purpose of selecting the linearization factor ul(k) from a stored table, the actuating value ui(k) being multiplied by the linearization factor ul(k) at the program point 3.

The essential feature of the invention is that the method for the closed-loop control of the controlled system 5, in particular an internal combustion engine, is divided into steps which are determined at the program point 2, and linearization, which is carried out at the program point 4. In this way, it is possible for the closed loop control system 2 to be specified as if the controlled system 5 had a linear control action. The nonlinear action of the controlled system 5 is taken into account by the linearization 4. The effect achieved as a result of this is that the closed loop control system 2 can be used for different controlled systems 5, the varying nonlinear action of the different controlled systems 5 being taken into account by different linearizations 4. One and the same closed loop control method 2 can thus be employed for different controlled systems 5, but a linearization 4 must be created for each controlled system 5. As a result of the linearization 4, the state variable ni(k) of the controlled system 5, which is taken into account in the closed loop control system 2, exhibits a linear control action.

FIG. 2 shows, plotted against the speed n (revolutions per minute), a linearization characteristic curve A, an efficiency characteristic curve B, which represents the differential efficiency ($\Delta\epsilon$:$\Delta$n) as a function of the speed n, and an effective characteristic curve C, which represents the linear control action of the controlled system 5. It is evident from the profile of the efficiency characteristic curve B that the differential efficiency $\epsilon$ of the internal combustion engine in the range illustrated increases as the speed increases. Efficiency is to be understood to be the ratio of energy used (fuel) to energy obtained (motive energy) using the example of the internal combustion engine.

Thus, the internal combustion engine represented by the controlled system 5 has a nonlinear action over the speed range illustrated. In order to map the control action of the controlled system 5 onto a linear control action, the linearization characteristic curve A is determined by which the efficiency characteristic curve B is multiplied and the linear effective characteristic curve C is obtained as a result.

The effective characteristic curve C represents the control action of the controlled system 5 when the linearization characteristic curve A is used. The controlled system 5 consequently exhibits a linear control action for the closed-loop control system 2. For different nonlinear control actions, correspondingly different linearization characteristic curves A are determined which convert the nonlinear control action into a linear control action. The linearization characteristic curve A is determined experimentally and is stored in a memory.

FIG. 3 shows an advantageous configuration of the closed loop control system 2. The closed loop control system 2 has a program point 21, at which an averaged speed nMA(k) is subtracted from the delayed desired speed ns(k) and a first input value eo(k) is obtained as a result. At a PI controller 22 (program point 22), the first input value eo(k) is subjected to a proportional and integral control process, and a first output value uo(k) is obtained. At program point 23, the cylinder-selective speed ni(k) is subtracted from the first input value eo(k) and a second input value ei(k) is obtained.

At a PD controller 24 (program point 24), the second input value ei(k) is subjected to a proportional and derivative control process and the actuating value ui(k) is obtained as a result, which is subsequently processed further at the program point 3 as illustrated in FIG. 1. At a MA filter 25 (program point 25), the cylinder-selective speed ni(k) is subjected to average value filtering and the averaged speed nMA(k) is obtained as an output value.

The method according to the invention is explained in more detail below with reference to FIGS. 1 to 3. Depending on various operating states of the internal combustion engine shown as the controlled system 5, a desired speed ns is read from a memory and the transfer function:

$$ns(k)=\alpha ns+(1-\alpha)ns(k-1)$$

is calculated at the program point 1, where $\alpha$ designates a delay time, which may be 0.1 second, for example, ns(k) designates the delayed desired speed at the instant k and ns(k-1) designates the delayed desired speed at the instant k-1.

The transfer function enables an improved transient behavior of the control method in the event of a change from a nonregulated range to a regulated range or in the event of a change from a regulated range to a nonregulated range. The transition is realized by a temporal delay and adaptation of the magnitude of the desired speed ns. The explicitly represented transfer function has a first-order delay element, but higher-order delay elements can also be used.

At the program point 2, the actuating value ui(k) is calculated from the delayed desired speed ns(k) and the cylinder-selective speed ni(k), as illustrated in FIG. 3. The individual method steps of the closed-loop control system 2 are illustrated in FIG. 3. At the program point 21, the averaged speed nMA(k) is subtracted from the delayed desired speed ns(k), and the first input value eo(k) is obtained.

At the MA filter 25, an averaged speed nMA(k) is calculated from the cylinder-selective speed ni(k) according to the following formula:

$$nMA(k) = \frac{1}{Z} * \sum_{j=0}^{Z-1} ni(k-j), \text{ where}$$

Z represents a predetermined number of samples, for example six, over which the cylinder-selective speed ni is averaged.

The subtraction at the program point 21 is carried out by the following formula:

$$eo(k)=ns(k)-nMA(k).$$

At the PI controller 22, the first input value eo(k) is subjected to the proportional and integral control in the course of which the first output value uo(k) is calculated by the following formula:

$$uo(k) = uo(k-1) + K0 * \left[eo(k) - \left(1 - \frac{Ta}{Tn}\right)eo(k-1)\right],$$

where K0 represents a gain factor, which amounts to 0.9, for example,

Ta represents the sampling time with which the cylinder-selective speed ni(k) is sampled, and Tn represents an integral action time, which amounts to 30 msec, for example.

At the program point 23, the cylinder-selective speed ni(k) is subtracted from the first output value uo(k) according to the following formula:

$$ei(k) = uo(k) - ni(k).$$

The second input value ei(k) obtained in this way is subjected to the following proportional and derivative control process at the PD controller 24:

$$ui(k) = Ki * \left[ ei(k) - \frac{Tv}{Ta}(ei(k) - ei(k-1)) \right], \quad \text{where}$$

Ki represents a second gain factor, which amounts to 0.0025, for example, Tv represents a derivative action time, which amounts to 400 msec, for example, and Ta represents the sampling time. The actuating value ui(k) calculated in this way is subsequently multiplied by the linearization factor ul(k) at the program point 3 according to the following formula:

$$us(k) = ui(k) * ul(k).$$

The manipulated variable us(k) calculated at the program point 3 is fed, for example in the form of a mass of fuel to be injected, to the internal combustion engine at the controlled system 5 and the cylinder-selective speed ni(k) is measured.

At the program point 4, the linearization factor ul(k) is determined from the cylinder-selective speed ni(k) using the linearization characteristic curve A. For example, at a cylinder-selective speed ni(k) of 600 revolutions per minute, a linearization factor ul(k) of 8 is read from FIG. 2, by which, at the program point 3, the actuating value ui(k) is multiplied and the manipulated variable us(k) is obtained, the latter being fed to the controlled system 5. The manipulated variable us(k) defines an amount of fuel which is fed to the internal combustion engine.

We claim:

1. A method for the closed-loop control of a controlled system, which comprises:

determining a state variable of a controlled system;

subtracting the state variable from a reference variable for deriving a first input value;

subjecting the first input value to a proportional and integral control process for deriving an output value;

subtracting the state variable from the output value for deriving a second input value;

subjecting the second input value to a proportional and derivative control process for deriving an actuating value;

weighting the actuating value with a correction value, the correction value chosen as a function of the state variable of the controlled system, the weighting of the actuating value with the correction value leading to a linear control action of the controlled system; and feeding the weighted actuating value to the controlled system.

2. The method according to claim 1, which comprises multiplying the actuating value by the correction value in the weighting step.

3. The method according to claim 1, which comprises averaging the state variable over time before subtracting the state variable from the reference variable.

4. The method according to claim 1, which comprises using the reference variable as a temporally delaying reference variable.

5. The method according to claim 1, which comprises using the following function as the proportional and integral control process:

$$uo(k) = uo(k-1) + K0 * \left[ eo(k) - \left(1 - \frac{Ta}{Tn}\right) eo(k-1) \right],$$

where uo(k) represents the output value, eo(k) represents the first input value, K0 represents a gain factor, Ta represents a sampling time and Tn represents an integral action time.

6. The method according to claim 1, which comprises using the following function as the proportional and derivative control process:

$$ui(k) = Ki * \left[ ei(k) - \frac{Tv}{Ta}(ei(k) - ei(k-1)) \right], \quad \text{where}$$

where ui(k) designates the actuating value, ei(k) designates the second input value, Ki designates a second gain factor, Ta designates a sampling time and Tv designates a derivative action time.

* * * * *